United States Patent
Montojo et al.

(10) Patent No.: US 8,914,048 B2
(45) Date of Patent: Dec. 16, 2014

(54) METHOD AND APPARATUS FOR ENHANCED PAGING

(75) Inventors: Juan Montojo, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1551 days.

(21) Appl. No.: 11/681,156

(22) Filed: Mar. 1, 2007

(65) Prior Publication Data

US 2007/0254679 A1 Nov. 1, 2007

Related U.S. Application Data

(60) Provisional application No. 60/795,675, filed on Apr. 28, 2006.

(51) Int. Cl.
*H04W 68/00* (2009.01)
*H04W 72/00* (2009.01)

(52) U.S. Cl.
USPC ............ 455/458; 370/311; 370/329; 455/450; 455/574

(58) Field of Classification Search
USPC .............. 455/456.1–458, 450–453, 574, 434, 455/501, 515; 370/311, 329, 330, 328
See application file for complete search history.

(56) References Cited

U.S. PATENT DOCUMENTS

| | | | |
|---|---|---|---|
| 5,590,133 A * | 12/1996 | Billstrom et al. | ............ 370/349 |
| 5,640,414 A | 6/1997 | Blakeney, II et al. | |
| 5,673,259 A * | 9/1997 | Quick, Jr. | ...................... 370/342 |
| 5,999,816 A | 12/1999 | Tiedemann, Jr. et al. | |
| 6,138,034 A | 10/2000 | Willey | |
| 6,216,004 B1 | 4/2001 | Tiedemann et al. | |
| 6,307,846 B1 * | 10/2001 | Willey | .......................... 370/329 |
| 6,332,006 B1 | 12/2001 | Rydbeck et al. | |
| 6,393,295 B1 | 5/2002 | Butler et al. | |

(Continued)

FOREIGN PATENT DOCUMENTS

CN 2574321 9/2003
EP 0843497 A2 5/1998

(Continued)

OTHER PUBLICATIONS

International Search Report—PCT/US07/067682, International Search Authority—European Patent Office, Feb. 1, 2008.

(Continued)

*Primary Examiner* — Daniel Lai
(74) *Attorney, Agent, or Firm* — Paul Kuo (57) ABSTRACT

Techniques for paging user equipments (UEs) in a wireless communication system are described. In one aspect, a cell sends a paging indicator to a UE, monitors for an acknowledgement from the UE, and sends a page message to the UE if an acknowledgement is received from the UE. The cell may receive channel quality information from the UE and may send the page message with link adaptation and/or HARQ to improve performance. In another aspect, a cell sends a paging indicator on a shared control channel to a UE and sends a page message on a shared data channel to the UE. The paging indicator and page message may be sent from multiple cells to the UE. Alternatively, the paging indicator may be sent from multiple cells to the UE, and the page message may be sent from a single cell to the UE.

33 Claims, 10 Drawing Sheets

(56) References Cited

U.S. PATENT DOCUMENTS

| | | | |
|---|---|---|---|
| 6,421,540 B1 | 7/2002 | Gilhousen et al. | |
| 6,526,027 B1* | 2/2003 | Yeom | 370/312 |
| 6,622,251 B1* | 9/2003 | Lindskog et al. | 713/300 |
| 6,738,629 B1* | 5/2004 | McCormick et al. | 455/456.1 |
| 6,745,056 B2 | 6/2004 | Wang et al. | |
| 6,977,957 B2 | 12/2005 | Sarkar et al. | |
| 7,212,831 B2 | 5/2007 | Lee | |
| 7,590,094 B2* | 9/2009 | Qian et al. | 370/332 |
| 2001/0008838 A1* | 7/2001 | Toskala et al. | 455/458 |
| 2002/0061050 A1* | 5/2002 | Ozluturk et al. | 375/141 |
| 2002/0093920 A1 | 7/2002 | Neufeld et al. | |
| 2002/0170013 A1 | 11/2002 | Bolourchi et al. | |
| 2003/0008691 A1* | 1/2003 | Chen et al. | 455/574 |
| 2003/0063579 A1 | 4/2003 | Lee | |
| 2003/0095513 A1* | 5/2003 | Woodmansee et al. | 370/324 |
| 2004/0087320 A1 | 5/2004 | Kim et al. | |
| 2004/0091022 A1* | 5/2004 | Sarkar et al. | 375/147 |
| 2004/0147271 A1* | 7/2004 | Billon et al. | 455/458 |
| 2004/0240471 A1* | 12/2004 | Terry | 370/469 |
| 2005/0105487 A1 | 5/2005 | Rudolf et al. | |
| 2006/0040681 A1 | 2/2006 | Julka et al. | |
| 2007/0183385 A1 | 8/2007 | Bi et al. | |
| 2007/0218901 A1 | 9/2007 | Tenny | |
| 2008/0051116 A1 | 2/2008 | Willey | |
| 2008/0159323 A1 | 7/2008 | Rinne et al. | |
| 2011/0201361 A1 | 8/2011 | Montojo et al. | |

FOREIGN PATENT DOCUMENTS

| | | |
|---|---|---|
| EP | 0898439 A1 | 2/1999 |
| EP | 1638212 | 3/2006 |
| JP | 2002509385 | 3/2002 |
| JP | 2002232950 A | 8/2002 |
| JP | 2003502880 A | 1/2003 |
| JP | 2003524993 | 8/2003 |
| JP | 2003524996 A | 8/2003 |
| JP | 2003536286 | 12/2003 |
| JP | 2006020362 A | 1/2006 |
| RU | 2003125333 A | 2/2005 |
| WO | 9854919 A2 | 12/1998 |
| WO | WO9931828 A1 | 6/1999 |
| WO | WO9967972 | 12/1999 |
| WO | 0163808 A1 | 8/2001 |
| WO | 0163824 A1 | 8/2001 |
| WO | 02093296 A2 | 11/2002 |
| WO | WO2007128712 | 11/2007 |

OTHER PUBLICATIONS

Ericsson, "Paging for E-UTRA," TSG-RAN WG1 #44 R1-060576, Denver, Co, USA, Feb. 13-17, 2006.

Written Opinion—PCT/US2007/067682, International Search Authority, European Patent Office, Feb. 1, 2008.

European Search Report—EP10150537—Search Authority—Munich—Feb. 11, 2010.

European Search Report—EP10150539—Search Authority—Munich—Feb. 4, 2010.

European Search Report—EP10150540—Search Authority—Munich—Feb. 4, 2010.

Taiwan Search Report—TW096115210—TIPO—Jul. 9, 2011.

Taiwan Search Report—TW096115210—TIPO—Jul. 15, 2013.

* cited by examiner

METHOD AND APPARATUS FOR ENHANCED PAGING

The present application claims priority to provisional U.S. Application Ser. No. 60/795,675, entitled "Method and Apparatus for Enhanced Paging," filed Apr. 28, 2006, assigned to the assignee hereof and incorporated herein by reference.

BACKGROUND

I. Field

The present disclosure relates generally to communication, and more specifically to techniques for paging user equipments (UEs) in a wireless communication system.

II. Background

A UE in a wireless communication system (e.g., a cellular phone in a cellular system) may operate in one of several states, such as active and sleep states, at any given moment. In the active state, the UE may actively exchange data with one or more Node Bs (or base stations), e.g., for a voice or data call. In the sleep state, the UE may power down much of the time to conserve battery power and may wake up periodically to monitor for page messages sent to the UE. These page messages may alert the UE to the presence of an incoming call or may provide other information.

A wireless communication system expends radio resources to support paging. For example, the system may send paging indicators on a paging indicator channel (PICH) to indicate whether page messages are sent for UEs. The system may send page messages on a paging channel (PCH) to the UEs. A UE may quickly receive the paging indicators, determine whether a page message is sent to the UE, and either process the PCH if a page message is sent or go back to sleep immediately if no page messages are sent to the UE. The PICH and PCH are overhead channels that are used for all UEs. Hence, these overhead channels are typically sent at a sufficiently low rate and with sufficient transmit power such that even the most disadvantaged UE with the worst-case channel conditions can reliably receive the paging indicators and page messages. Furthermore, since the location of the UEs being paged may not be known, the system typically sends paging indicators and page messages from all cells in a wide area. Sending paging indicators and page messages on overhead channels over a wide area at low rate and/or high transmit power may consume much radio resources.

There is therefore a need in the art for techniques to efficiently page UEs.

SUMMARY

Techniques for paging UEs in a wireless communication system are described herein. In one aspect, a cell sends a paging indicator and possibly UE identification information to a UE. The UE identification information identifies the UE as the intended recipient of the paging indicator and may comprise all or a portion of a UE identifier that uniquely identifies the UE. The cell sends a page message to the UE if an acknowledgement for the paging indicator is received from the UE. The cell may receive channel quality information from the UE and may send the page message with link adaptation and/or hybrid automatic retransmission (HARQ) to improve performance.

In another aspect, a cell sends a paging indicator on a shared control channel to a UE and sends a page message on a shared data channel to the UE. The paging indicator and page message may be sent from multiple cells to the UE. Alternatively, the paging indicator may be sent from multiple cells to the UE, and the page message may be sent from a single cell to the UE.

Various aspects and features of the disclosure are described in further detail below.

DETAILED DESCRIPTION

The paging techniques described herein may be used for various communication systems such as Code Division Multiple Access (CDMA) systems, Frequency Division Multiple Access (FDMA) systems, Time Division Multiple Access (TDMA) systems, Orthogonal FDMA (OFDMA) systems, Single-Carrier FDMA (SC-FDMA) systems, etc. The terms "systems" and "networks" are often used interchangeably. A CDMA system may utilize a radio technology such as Wideband-CDMA (W-CDMA), cdma2000, etc. cdma2000 covers IS-95, IS-2000, and IS-856 standards. A TDMA system may utilize a radio technology such as Global System for Mobile Communications (GSM). These various radio technologies, standards, and systems are known in the art. An OFDMA system utilizes Orthogonal Frequency Division Multiplexing (OFDM) and sends modulaton symbols in the frequency domain on orthogonal subcarriers. An SC-FDMA system utilizes Single-Carrier Frequency Division Multiplexing (SC-FDM) and sends modulation symbols in the time domain on orthogonal subcarriers. For clarity, the paging techniques are described below for a wireless communication system that utilizes Long Term Evolution (LTE), which is a radio technology being developed. However, the paging techniques may also be used for various other wireless communication systems.

Figure 1:
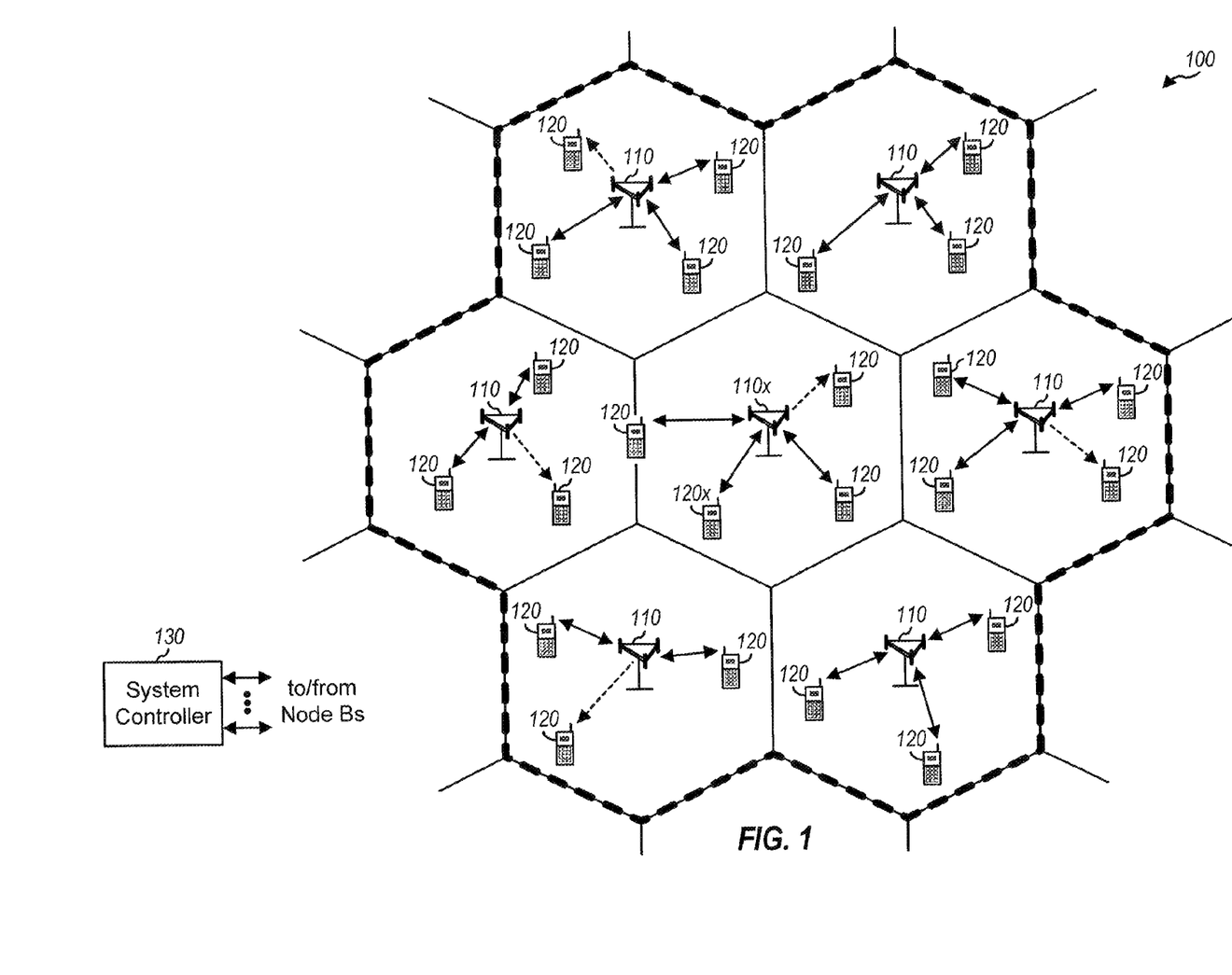
FIG. 1 shows a wireless communication system.

FIG. 1 shows a wireless communication system 100 with multiple Node Bs 110. A Node B is generally a fixed station that communicates with the UEs and may also be referred to as a base station, an evolved Node B (eNode B), an access point, etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the Node B for the cell.

UEs 120 may be dispersed throughout the system. A UE may be stationary or mobile and may also be referred to as a mobile station, a mobile equipment, a terminal, an access terminal, a station, etc. A UE may be a cellular phone, a personal digital assistant (PDA), a wireless modem, a wireless communication device, a handheld device, a subscriber unit, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates data exchanges between a Node B and a UE in the active state. A broken line with a single arrow indicates a UE in the sleep state and receiving page messages and/or other information. A UE may be served by a specific Node B, which is referred to as a serving cell for the UE.

A system controller 130 may couple to Node Bs 110 and provide coordination and control for these Node Bs. System controller 130 may be a single network entity or a collection of network entities. System controller 130 may also be referred to as a Radio Network Controller (RNC), a Mobile Switching Center (MSC), etc.

Figure 2:
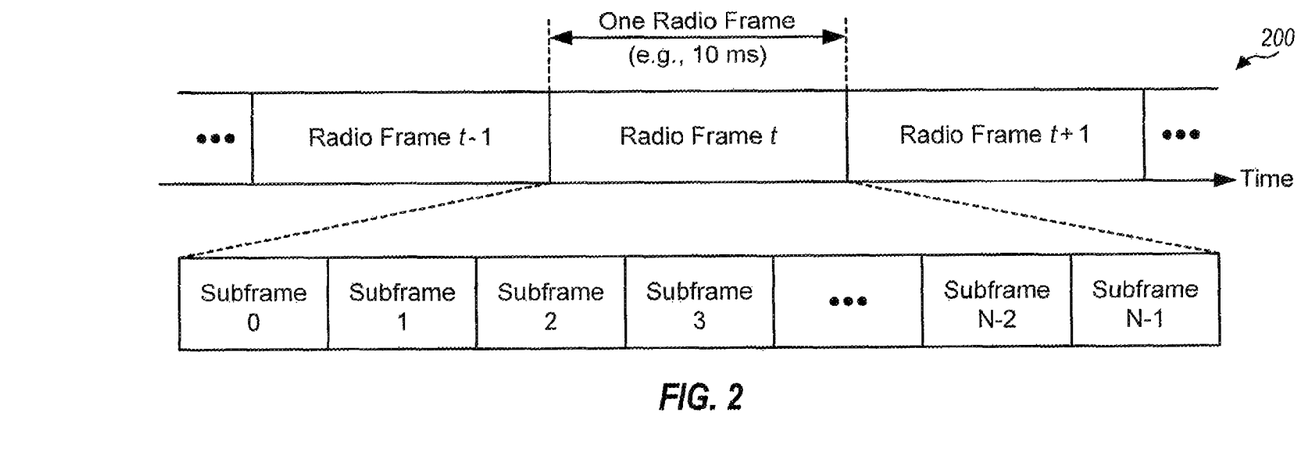
FIG. 2 shows a design of a frame format.

FIG. 2 shows a design of a frame format 200 for system 100. The transmission timeline may be divided into radio frames. Each radio frame may be identified by a system frame number (SFM) and may have a predetermined duration, e.g., 10 milliseconds (ms). Each radio frame may be partitioned into multiple (N) subframes, e.g., N=20 or some other value. In general, the radio frames and subframes may have any durations and may also be referred to by some other terminology, e.g., frames, slots, etc.

Figure 3:
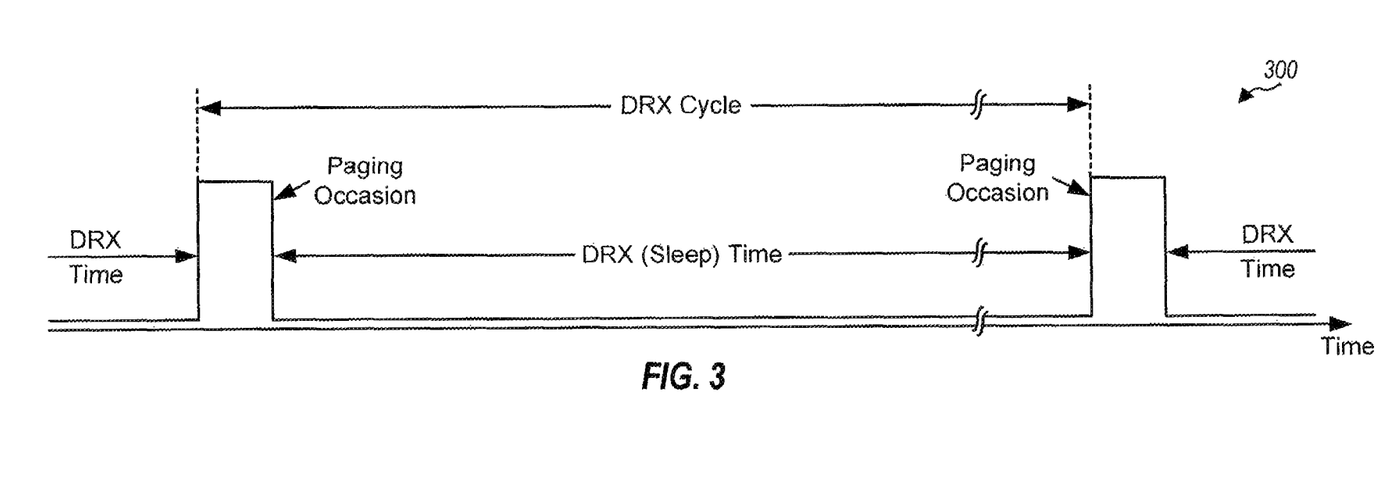
FIG. 3 shows a timeline for a UE in a DRX mode of operation.

FIG. 3 shows a timeline 300 for a UE in a discontinuous reception (DRX) mode of operation. The DRX mode may also be referred to as slotted mode paging. In the DRX mode, the UE is assigned paging occasions, which are time periods in which the UE can receive pages. Each paging occasion may correspond to a specific radio frame, a specific subframe of a specific radio frame, etc. The paging occasions may also be referred to as paging periods, paging frames, paging subframes, etc. The paging occasions for the UE may be separated by a time interval referred to as a DRX cycle. The DRX cycle may be configurable for the UE. The paging occasions for the UE may be determined based on parameters such as, e.g., a UE-specific identifier (UE ID) for the UE.

The UE may wake up periodically prior to its paging occasions to receive any page messages sent to the UE. Page messages are also referred to as paging messages, pages, etc. Page messages are not sent to the UE outside of its paging occasions. The UE may thus go to sleep during the time between its paging occasions if there are no other tasks to perform. The UE may power down as much circuitry as possible while asleep in order to conserve battery power.

System 100 may utilize logical channels, transport channels, and physical channels to support various services. A Medium Access Control (MAC) layer may provide data transfer services on logical channels. Different types of logical channel may be defined for different kinds of data transfer services, and each logical channel type may carry different type of information. The MAC layer may map the logical channels to transport channels and may process (e.g., encode and modulate) logical channel data to generate MAC protocol data units (PDUs). A physical layer (PHY) may map the transport channels to physical channels and may process (e.g., channelize and scramble) the MAC PDUs to generate output data for the physical channels.

Figure 4:
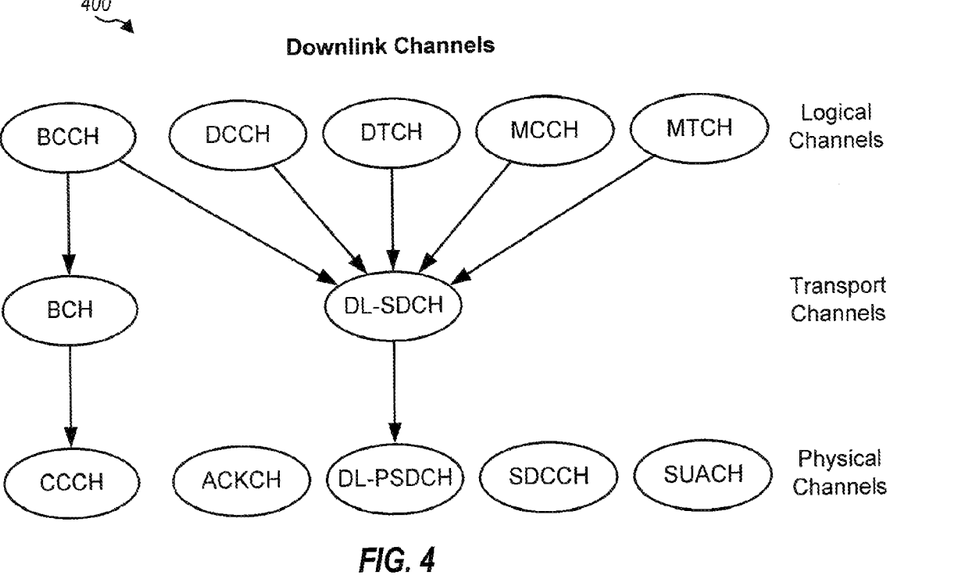
FIG. 4 shows a design of downlink logical, transport, and physical channels.

FIG. 4 shows a design of logical, transport, and physical channels for the downlink (DL). In this design, the downlink logical channels include:

Broadcast control channel (BCCH)—carry system control information,
Dedicated traffic channel (DTCH)—carry user information for a specific UE,
Dedicated control channel (DCCH)—carry control information for a specific UE,
MBMS traffic channel (MTCH)—carry traffic data for multiple UEs, and
MBMS control channel (MCCH)—carry scheduling and control info for MTCH(s), where MBMS stands for Multimedia and Broadcast Mobile Services.

The downlink transport channels include:
Broadcast channel (BCH)—carry part of the BCCH, and
DL shared data channel (DL-SDCH)—carry the DCCH, DTCH, MCCH, MTCH, and part of the BCCH.

A different transport channel for MBMS traffic and control may exist in an MBMS channel (MCH).

The downlink physical channels include:
Common control channel (CCCH)—carry system and cell parameters to demodulate other physical channels and carry the BCH,
Acknowledgement channel (ACKCH)—carry acknowledgement (ACK)/negative acknowledgement (NAK) for the UL-SDCH,
DL physical shared data channel (DL-PSDCH)—carry the DL-SDCH,
Shared DL control channel (SDCCH)—carry control info for the DL-PSDCH, and
Shared UL assignment channel (SUACH)—carry UL PHY resource assignments.

PHY resources refer to resources used for physical channels. PHY resources may be quantified by frequency (e.g., subcarriers), time (e.g., time intervals), code (e.g., channelization codes), space (e.g., transmit antennas), transmit power, etc.

FIG. 4 also shows a mapping of logical channels to transport channels and a mapping of transport channels to physical channels. Some of the downlink transport and physical channels are described in further detail below.

Figure 5:
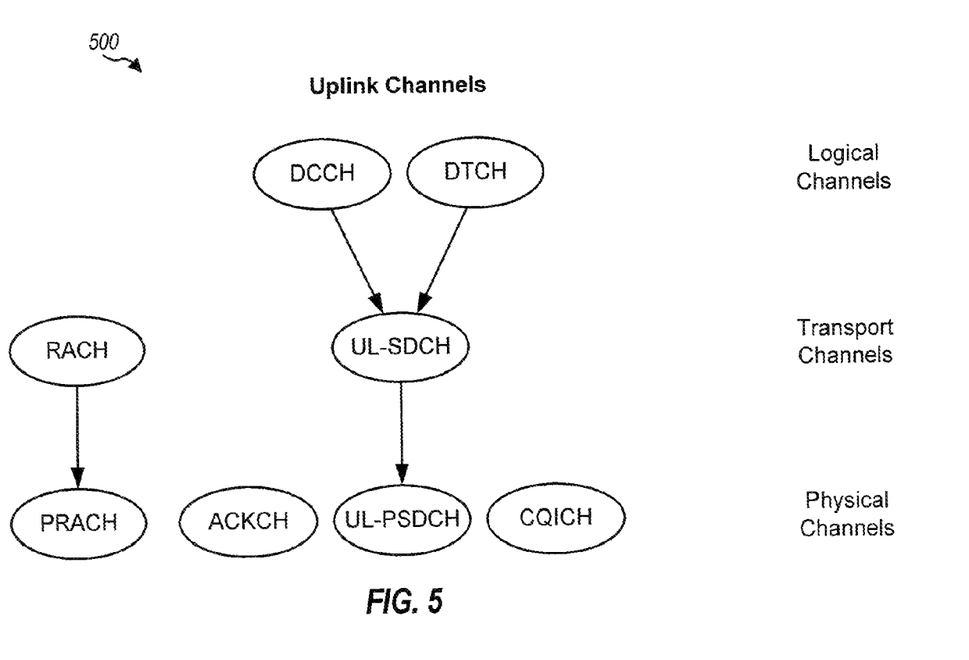
FIG. 5 shows a design of uplink logical, transport, and physical channels.

FIG. 5 shows a design of logical, transport, and physical channels for the uplink (UL). In this design, the uplink logical channels include the DCCH and DTCH. The uplink transport channels include:

Random access channel (RACH)—carry access requests and possibly other information, and
UL shared data channel (UL-SDCH)—carry the DCCH and DTCH.

Depending on the information conveyed by the RACH, the RACH may be regarded as a physical channel only.

The uplink physical channels include:
Physical random access channel (PRACH)—carry the RACH,
UL physical shared data channel (UL-PSDCH)—carry the UL-SDCH,
Acknowledgement channel (ACKCH)—carry ACK/NAK for the DL-SDCH, and
Channel quality indicator channel (CQICH)—carry CQI for DL signal quality.

FIG. 5 also shows a mapping of logical channels to transport channels and a mapping of transport channels to physical channels. Some of the uplink transport and physical channels are described in further detail below.

FIGS. 4 and 5 show specific designs of downlink and uplink channels that are referred to in the description below. In general, a system may support any number and any type of logical, transport, and physical channels for each link, e.g., fewer, more, and/or different channels than the ones given above. The logical, transport, and physical channels may also be mapped in other manners.

A UE may register with the system and may "camp" on a serving cell when not in active communication. At the time of registration, the UE is located within the coverage of the serving cell and is also within a paging area that covers the serving cell and nearby cells. Referring back to FIG. 1, the serving cell for UE 120x may be Node B 110x, and the paging area of UE 120x may include the seven cells bounded by the heavy dashed line. Depending on its configuration, the UE may perform cell update whenever the UE moves to a new cell or paging area update whenever the UE moves to a new paging area.

Figure 6:
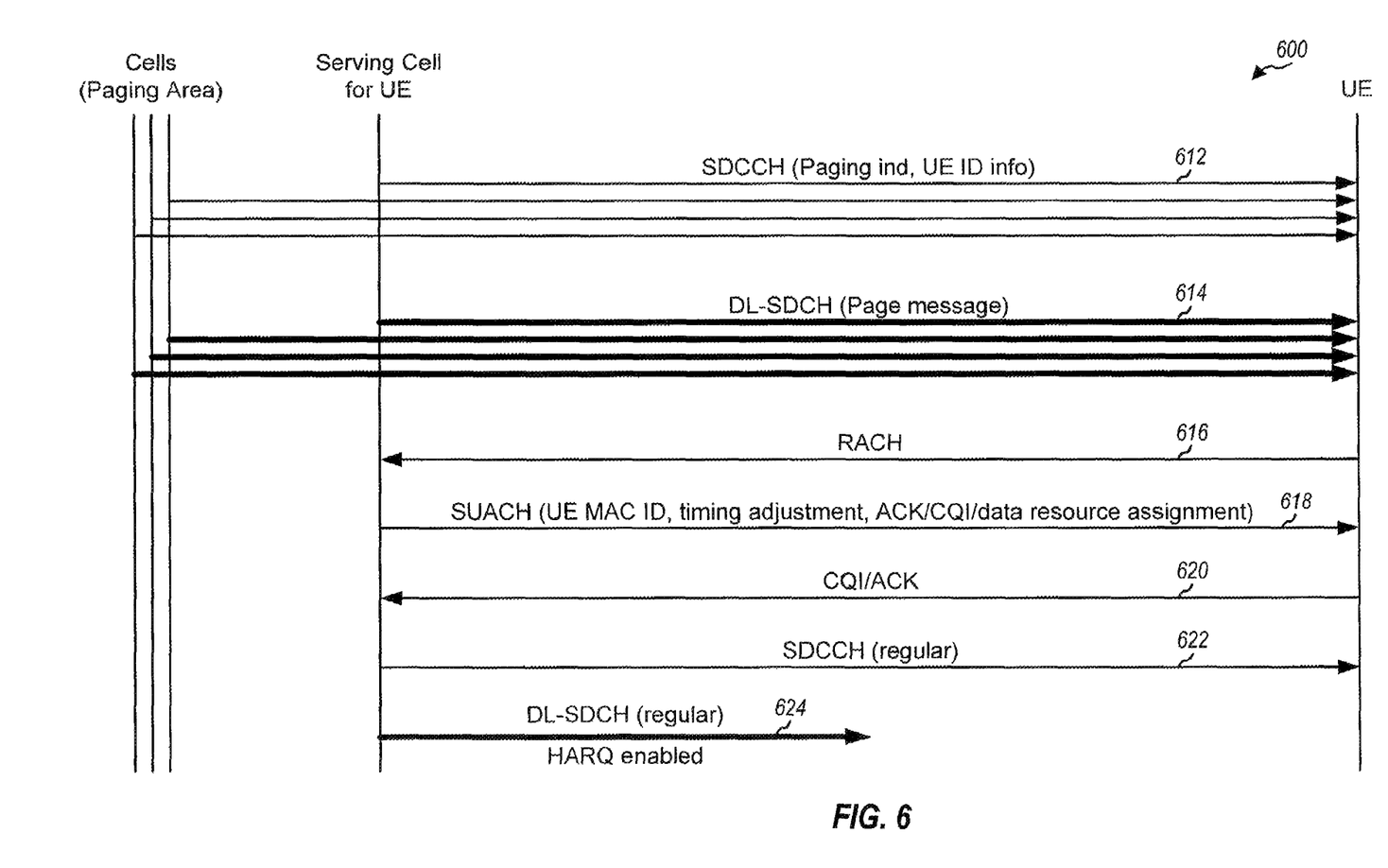
FIG. 6 shows a paging procedure that uses shared channels for paging.

FIG. 6 shows a design of a paging procedure 600 that uses shared channels for paging. A UE may be camping on a serving cell and may wake up periodically to monitor for pages, e.g., as shown in FIG. 3. At any given moment, the exact location of the UE may not be known. For example, the UE may have moved to a new cell while asleep between its paging occasions. Thus, when the system has a page for the UE, the serving cell and other cells in the paging area of the UE may send a paging indicator (Paging ind) and possibly UE identification information (UE ID info) to the UE (step 612). The UE identification information identifies the UE being paged and may comprise a full or partial UE ID and/or other information. The UE ID may be a Radio Network Temporary Identifier (RNTI), an International Mobile Subscriber Identifier (IMSI), a MAC ID, etc. An RNTI is a unique UE ID for a UE in the system. The paging indicator and UE identification information may be sent on the SDCCH as described below. The serving cell and other cells in the paging area may also send a page message on the DL-SDCH to the UE (step 614). Sending the paging indicator and page message from all cells in the paging area of the UE increases the likelihood that the UE can receive the page message when the location of the UE is not known with certainty.

The cells may send the paging indicator and page message in a manner that is known a priori so that, upon receiving the paging indicator, the UE knows where the page message is sent on the DL-SDCH and how to decode the page message. For example, each paging indicator sent on the SDCCH may be associated with a page message sent on the DL-SDCH using a predetermined modulation and coding scheme (MCS) and predetermined PHY resources. In this case, no control information may be sent on the SDCCH for the page message sent on the DL-SDCH. Alternatively, control information may be sent on the SDCCH to indicate where and/or how to recover the page message on the DL-SDCH.

The UE receives the page message from the DL-SDCH and may respond to the page message by performing random access and sending a transmission on the RACH (step 616). The RACH transmission may include an acknowledgement for the page message, channel quality information indicative of the downlink channel quality, a request for uplink PHY resources, etc. In general, any cell in the paging area of the UE may receive the RACH transmission depending on the current location of the UE. In one design, the cell that receives the RACH transmission may respond to the UE and perform the processing described below. In another design, the UE may direct the RACH transmission to a specific cell, e.g., by using a "signature" or a base sequence corresponding to the selected cell. The selected cell would then perform the processing described below if it can successfully receive the RACH transmission. The following description assumes that the serving cell receives the RACH transmission.

The serving cell receives the RACH transmission and may respond by sending an assignment on the SUACH (step 618). The SUACH transmission may include the MAC ID of the UE, timing adjustment to adjust the transmit timing of the UE, assignment of PHY resources for the ACKCH, CQICH, and/or UL-SDCH, etc. The MAC ID may be assigned to the UE during the exchange after the initial page and may be used to identify the transmission on the DL-SDCH. The ACKCH and/or CQICH assignment may also be implicit and not sent on the SUACH. For example, PHY resources for the ACKCH may be implicit from transmission on the DL-SDCH. The UE may thereafter send channel quality information on the CQICH and/or acknowledgements on the ACKCH (step 620).

For downlink data transmission, the serving cell may send control information on the SDCCH (step 622) and may send data on the DL-SDCH (step 624) in the normal/regular manner. The control information sent on the SDCCH may comprise various types of information such as e.g., the MAC ID of the target UE for the data transmission on the DL-SDCH, the MCS, resource allocation, and transmission time interval (TTI) for the data transmission, etc. The data transmission may be sent with hybrid automatic retransmission (HARQ), link adaptation, etc. With HARQ, a transmitter sends a transmission for a packet and may send one or more retransmissions, if needed, until the packet is decoded correctly by a receiver, or the maximum number of retransmissions has been sent, or some other termination condition is encountered. HARQ may improve reliability of data transmission. Link adaption may include rate control, power control, etc. Rate control refers to selection of a coding and modulation scheme such that a packet can achieve a desired performance metric. The metric may be quantified by, e.g., a target probability of correct decoding after a target number of retransmissions with HARQ. Power control refers to adjustment of transmit power to achieve a target received signal quality while reducing transmit power and interference. The serving cell may use the channel quality information received in step 620 for ling adaptation and may select an MCS and/or a transmit power level based on the received information.

In the design shown in FIG. 6, paging is supported using a shared control channel and a shared data channel that are shared by the UEs and are also used for different types of data. For example, DL-SDCH can carry user traffic data (DTCH) and user control information (DCCH) for specific UEs, broadcast data (MTCH) and broadcast control information (MCCH) for multiple UEs, etc. This design avoids the use of a separate paging indicator channel (PICH) and a separate paging channel (PCH) to support paging. The use of shared control and data channels for paging may provide certain advantages such as, e.g., simpler implementation at the UE and/or cells, improved utilization of PHY resources through multiplexing, no fixed overhead (e.g., for paging indicator channel, which is used in W-CDMA and cdma2000), etc.

Figure 7:
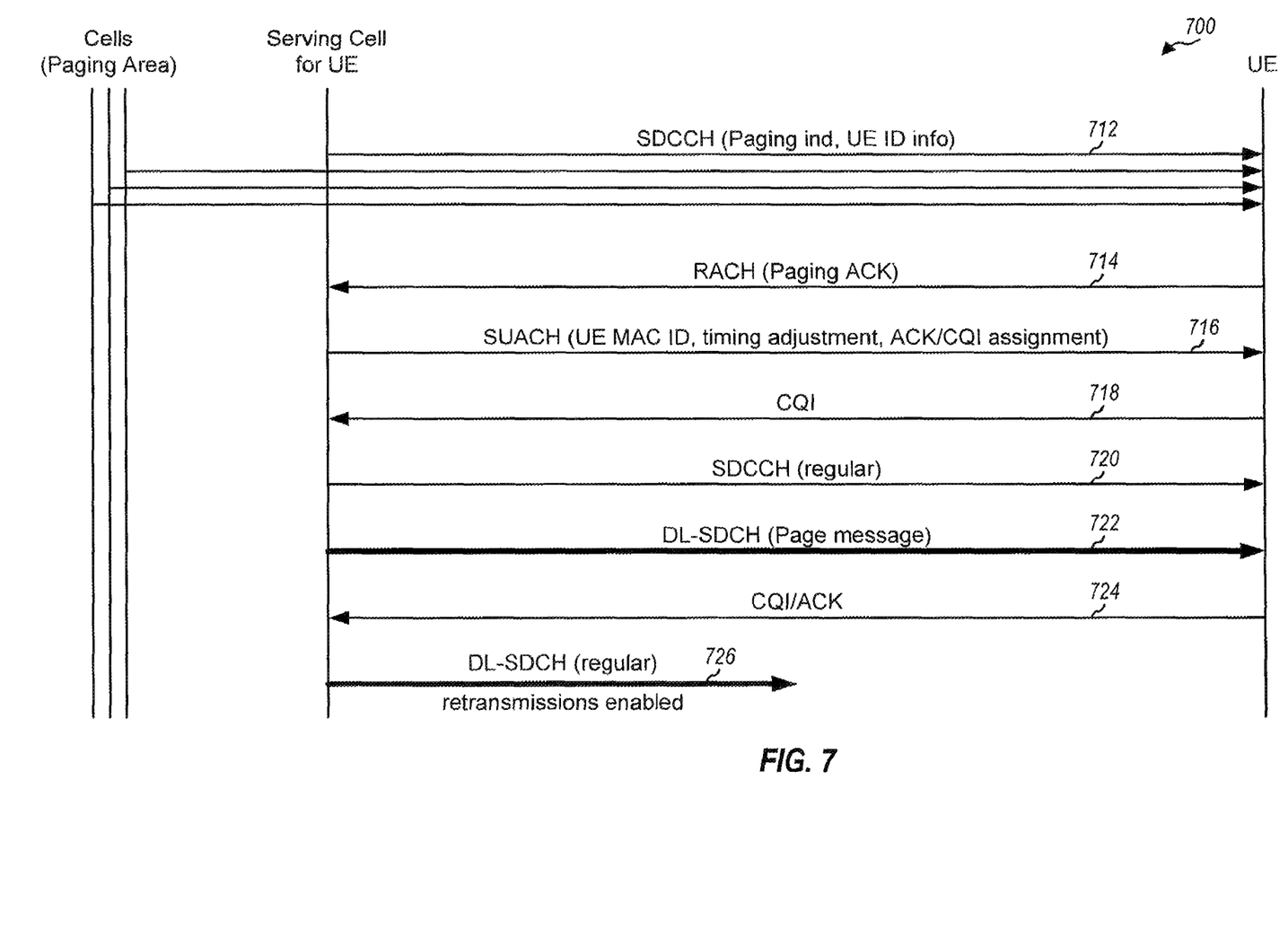
FIG. 7 shows a paging procedure that sends a page message from a single cell.

FIG. 7 shows a design of a paging procedure 700 that sends a page message from a specific cell. A UE may be camping on a serving cell and may wake up periodically to monitor for pages. When the system has a page for the UE, the serving cell and other cells in the paging area of the UE send a paging indicator and possibly UE identification information on the SDCCH to the UE (step 712). The UE receives the paging indicator and may respond to the paging indicator by performing random access and sending a transmission on the RACH (step 714). The RACH transmission may include an acknowledgement for the paging indicator, channel quality information, and/or other information. The RACH transmission may or may not include a request for uplink PHY resources on the UL-SDCH. The RACH transmission serves to acknowledge receipt of the paging indicator and to provide the current location of the UE. In particular, the current UE location may be ascertained based on the cell(s) that receive the RACH transmission. In general, any cell in the paging area may receive the RACH transmission, and the cell that receives the RACH transmission or the cell selected by the UE may respond to the UE. The following description assumes that the serving cell receives the RACH transmission.

The serving cell responds to the RACH transmission by sending an assignment on the SUACH (step 716). The SUACH transmission may include the MAC ID of the UE, timing adjustment for the UE, assignment of PHY resources for the ACKCH and/or CQICH, etc. The MAC ID sent in step 716 may be used as the UE ID during an active state. The UE ID in step 712 may be derived from the RNTI or IMSI and may be used as the UE ID in a non-active state. The ACK and/or CQI assignment may also be implicit and not sent on the SUACH. The UE may thereafter send channel quality information on the CQICH (step 718). Step 718 may be omitted, e.g., if the channel quality information is sent on the RACH in step 714. The serving cell may use the channel quality information for link adaptation and may select an MCS and/or a transmit power level for transmission to the UE based on the received information. The serving cell sends control information on the SDCCH (step 720) and sends a large message on the DL-SDCH to the UE (step 722). The serving cell may send the page message in the same manner as other types of data sent on the DL-SDCH. The control information may indicate where and/or how the page message is sent on the DL-SDCH. The UE may send channel quality information on the CQICH and/or an acknowledgement on the ACKCH for the page message (step 724). The serving cell may send one or more retransmissions for the page message, if needed, on the DL-SDCH until the page message is correctly decoded by the UE (step 726).

The design shown in FIG. 7 has various desirable features. First, paging is supported using shared control and data channels, similar to the design shown in FIG. 6. Second, only a small amount of information (e.g., just the paging indicator) is sent from all cells in the paging area of the UE, and the page message is sent from a single cell that can serve the UE. This may greatly reduce the amount of PHY resources used for paging. Third, the page message may be sent in an efficient manner using features that are available for normal data transmission, e.g., HARQ and link adaptation. This may further reduce the amount of PHY resources used to send the page message. In particular, the page message may be sent with an MCS and/or at a transmit power level that may be selected based on the channel conditions of the UE instead of the worst-case channel conditions for all UEs.

FIGS. 6 and 7 show specific designs of two paging procedures that use the transport and physical channels described above. Paging indicators and page messages may also be sent in other manners and/or using other transport and physical channels. For example, in FIG. 6, the first transmission of a page message may be sent on the DL-SDCH concurrent with a paging indicator on the SDCCH. One or more retransmissions of the page message may be sent thereafter, if needed. As another example, in FIG. 7, paging indicators may be sent on a paging indicator channel from all cells in a paging area, and page messages may be sent on a shared data channel from a single cell. Other paging designs and paging procedures may also be implemented.

The UEs may be mapped to paging occasions in various manners. In one design, the UEs are mapped to specific paging occasions, e.g., based on a hash of their UE IDs. Different UEs may be mapped in a pseudo-random manner to different time intervals in the transmission timeline. Each UE may wake up prior to its assigned paging occasions and monitor for paging indicators. One or multiple SDCCHs may be used to send paging indicators. If multiple SDCCHs are available, then the UEs may be mapped to different SDCCHs, e.g., based on their UE IDs. In this case, a paging occasion for a UE may correspond to a specific SDCCH in a specific time interval. In general, the UEs may be hashed to different SDCCHs in time and/or to different PHY resources within the same time. A goal of the hashing is to have UEs with the same least significant bit (LSB) portion of the UE IDs to be hashed to different SDCCHs so that a paging indicator at a given time can target a single UE or a small number of UEs.

UE identification information may be sent with a paging indicator to identify the UE being paged. In one design, the UE identification information comprises a complete UE ID, e.g., a complete RNTI, etc. This design allows each UE to determine with ambiguity whether a paging indicator is sent for that UE. This design may be used for the paging procedures shown in FIGS. 6 and 7.

In another design, the UE identification information comprises a partial UE ID, e.g., a predetermined number of LSBs of a UE ID, e.g., RNTI. In general, any portion of the UE ID and any number of bits may be used for the partial UE ID. The LSBs may be more random than the most significant bits (MSBs) and may be used for the partial UE ID. The number of bits to use may be a fixed or configurable value and may be dependent on the number of bits available on the SDCCH for UE identification information. This design reduces the number of bits to send for the UE identification information. The UEs may be mapped to paging occasions such that no two UEs with the same partial UE ID are mapped to the same paging occasion. In this case, all UEs that are mapped to each paging occasion can be uniquely identified based on their partial UE IDs. This mapping ensures that a partial UE ID sent in a paging occasion can unambiguously identify the UE being paged. The mapping of UEs to paging occasions may be performed in various manners. For example, a hash function may map UEs to paging occasions based on their UE IDs but avoid mapping two UEs with the same partial UE ID to the same paging occasion. This design may also be used for the paging procedures shown in FIGS. 6 and 7.

Sending UE identification information along with paging indicators may provide certain advantages. For example, the UEs can quickly ascertain whether or not page messages are being sent to them based on the UE identification information and can go to sleep right away without having to decode the data channel for the page messages. For the design shown in FIG. 7, only the UEs being paged (instead of all UEs) would respond on the RACH. This reduces the amount of uplink signaling for paging.

Paging indicators may be sent in various manners. In one design, a paging indicator is explicitly sent via a designated field. For example, a bit may be allocated in each paging occasion and may be set to either one ('1') to indicate a paging indicator being sent or zero ('0') to indicate no paging indicator being sent. Each UE can ascertain whether a paging indicator has been sent by checking this bit. In another design, a paging indicator is explicitly sent by a specific index or value for a designated field. For example, the control information for each transmission on the DL-SDCH may include a field that conveys the data type being sent in the transmission. A specific index may be assigned for paging, and the field may be set to this index whenever a page message is sent. In yet another design, a paging indicator is implicitly sent. This implicit signaling of the paging indicator may be achieved in various manners.

Figure 8:
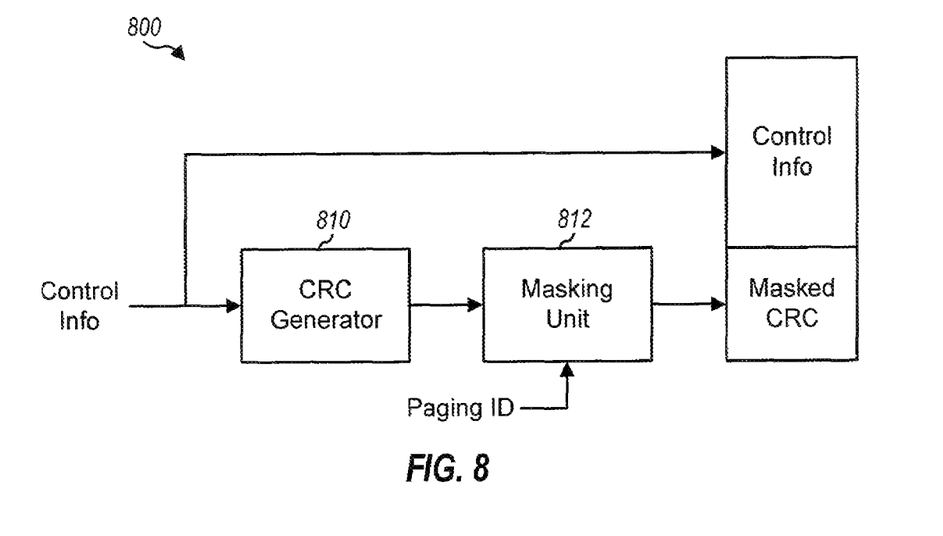
FIG. 8 shows a design for implicitly sending a paging indicator.

FIG. 8 shows a design 800 for implicitly sending a paging indicator. In this design, a cyclic redundancy check (CRC) generator 810 receives control information for the DL-SDCH and generates a CRC value. A masking unit 812 masks (e.g., scrambles) the CRC value with a paging ID and provides a masked CRC value. The paging ID is a specific sequence used for paging and is known to the cells and UEs. The control information and masked CRC value are sent on the SDCCH. The paging indicator is implicitly sent via the masked CRC value.

Figure 9:
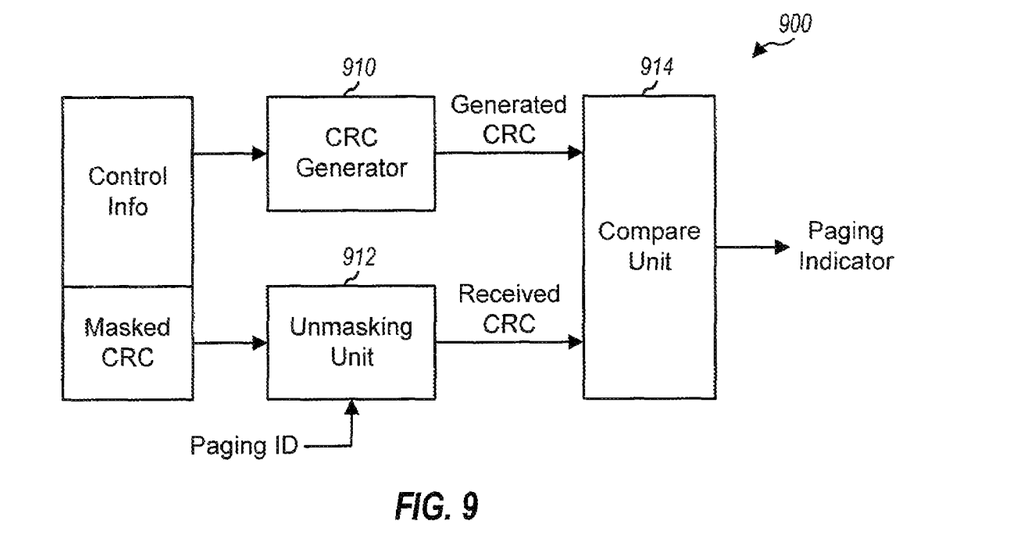
FIG. 9 shows a design for recovering an implicit paging indicator.

FIG. 9 shows a design 900 for recovering an implicit paging indicator. The control information and masked CRC value are received from the SDCCH. A CRC generator 910 generates a CRC value based on the received control information and provides a generated CRC value. An unmasking unit 912 unmasks (e.g., descrambles) the masked CRC value with the same paging ID used by the cell and provides a received CRC value. A compare unit 914 compares the generated CRC value against the received CRC value and indicates that a paging indicator has been sent if there is a match.

An implicit paging indicator may be sent in FIG. 6 by masking the control information or the CRC value sent on the SDCCH for the page message sent on the DL-SDCH. Each UE may unmask the control information of CRC value to determine whether a paging indicator has been sent. Other information may be masked. In any case, no additional PHY resources are used to send the implicit paging indicator.

Figure 10:
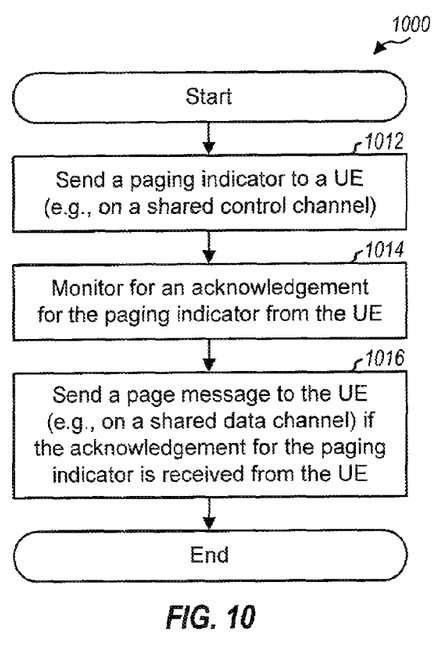
FIG. 10 shows a process performed by a cell to page a UE.

FIG. 10 shows a design of a process 1000 performed by a cell to page a UE. The cell sends a paging indicator to the UE (e.g., on a shared control channel) (block 1012). The cell may send UE identification information with the paging indicator. The UE identification information may identify the UE as the intended recipient of the paging indicator and may comprise all or a portion of a UE identifier that uniquely identifies the UE. The cell monitors (e.g., a random access channel) for an acknowledgement for the paging indicator from the UE (block 1014). The cell may ascertain that it is the cell designated to serve the UE based on reception of the acknowledgement.

The cell sends a page message to the UE (e.g., on a shared data channel) if the acknowledgement for the paging indicator is received from the UE (block 1016). The cell may send an assignment of uplink resources to the UE, which may use the uplink resources to send feedback information for downlink transmission of the page message. The cell may receive channel quality information from the UE and may use this information to send the page message with link adaptation and/or HARQ. The cell may select a modulation and coding scheme and/or a transmit power level based on the received channel quality information. The cell may send the page message in accordance with the selected modulation and coding scheme and/or at the selected transmit power level to the UE. The cell may send a transmission of the page message to the UE and may send a retransmission of the page message if an acknowledgement for the page message is not received. The paging indicator may be sent from multiple cells to the UE, and the page message may be sent from a single cell to the UE.

Figure 11:
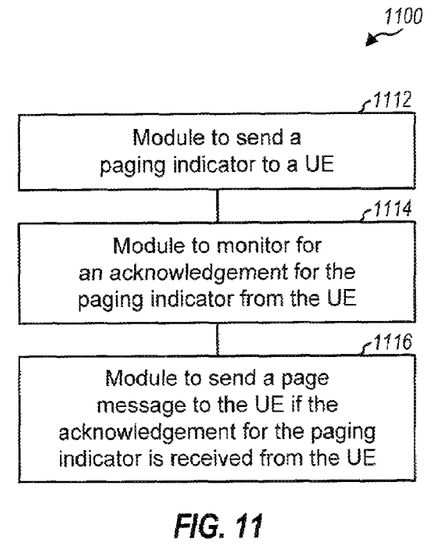
FIG. 11 shows an apparatus for paging a UE.

FIG. 11 shows an apparatus 1100 for paging a UE. Apparatus 1100 includes means for sending a paging indicator to the UE (module 1112), means for monitoring for an acknowledgement for the paging indicator from the UE (module 1114), and means for sending a page message to the UE if the acknowledgement for the paging indicator is received from the UE (module 1116). Modules 1112 and 1116 may comprise processors, electronics devices, hardware devices, electronics components, logical circuits, memories, etc., or any combination thereof.

Figure 12:
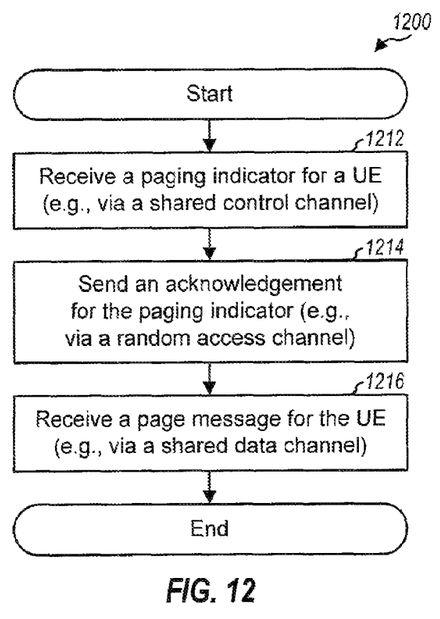
FIG. 12 shows a process performed by a UE to receive a page.

FIG. 12 shows a design of a process 1200 performed by a UE to receive a page. The UE receives a paging indicator for the UE, e.g., via a shared control channel (block 1212). The UE may receive UE identification information (e.g., a full or partial UE ID) with the paging indicator and may ascertain that the paging indicator is for the UE based on the UE identification information. The UE sends an acknowledgement for the paging indicator, e.g., via a random access channel (block 1214). The UE then receives a page message for the UE, e.g., via a shared data channel (block 1216). The UE may send channel quality information and may process the page message in accordance with a modulation and coding scheme selected based on the channel quality information. The UE may also receive a transmission and possibly one or more retransmissions for the page message.

Figure 13:
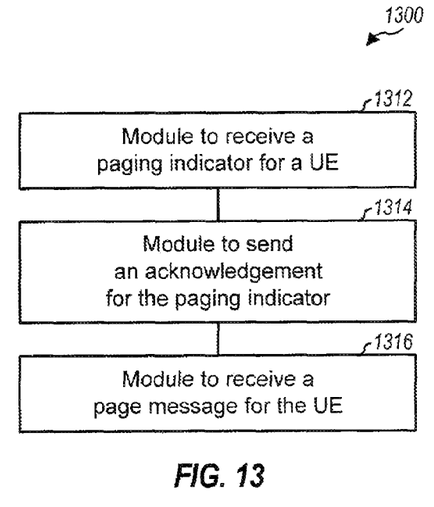
FIG. 13 shows an apparatus for receiving a page.

FIG. 13 shows an apparatus 1300 for receiving a page. Apparatus 1300 includes means for receiving a paging indicator for a UE (module 1312), means for sending an acknowledgement for the paging indicator (module 1314), and means for receiving a page message for the UE (module 1316). Modules 1312 to 1316 may comprise processors, electronics devices, hardware devices, electronics components, logical circuits, memories, etc. or any combination thereof.

Figure 14:
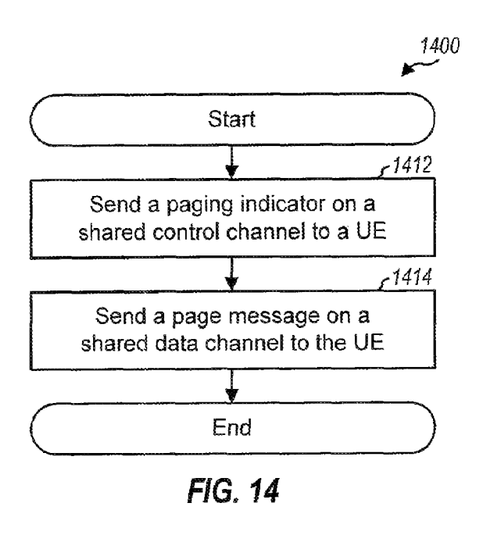
FIG. 14 shows another process performed by a cell to page a UE.

FIG. 14 shows a design of a process 1400 performed by a cell to page a UE. The cell sends a paging indicator on a shared control channel to the UE (block 1412). The cell sends a page message on a shared data channel to the UE (block 1414). The cell may send UE identification information with the paging indicator to identify the UE as an intended recipient of the paging indicator. The shared control channel may carry control information for the shared data channel. The shared data channel may carry data for different UEs and/or different types of data. The paging indicator and page message may be sent from multiple cells to the UE, e.g., as shown in FIG. 6. Alternatively, the paging indicator may be sent from multiple cells to the UE, and the page message may be sent from a single cell to the UE, e.g., as shown in FIG. 7.

Figure 15:
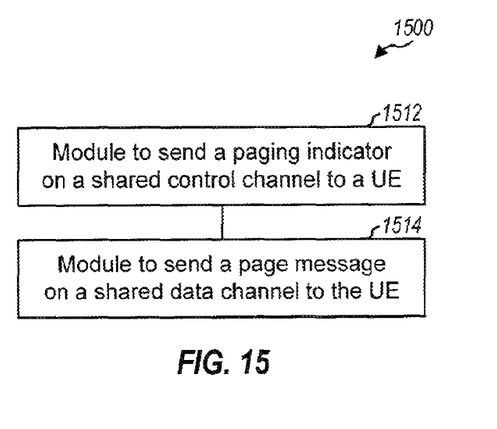
FIG. 15 shows another apparatus for paging a UE.

FIG. 15 shows an apparatus 1500 for paging a UE. Apparatus 1500 includes means for sending a paging indicator on a shared control channel to the UE (module 1512) and means for sending a page message on a shared data channel to the UE (module 1514). Modules 1512 and 1514 may comprise processors, electronics devices, hardware devices, electronics components, logical circuits, memories, etc., or any combination thereof.

Figure 16:
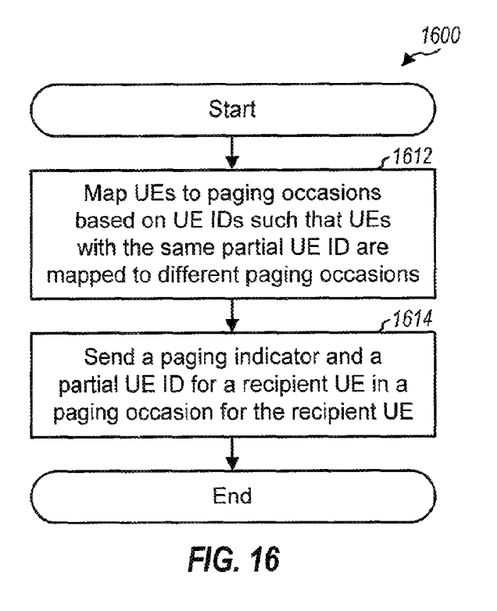
FIG. 16 shows a process performed by a network entity for paging.

FIG. 16 shows a design of a process 1600 performed by a cell and/or a system controller for paging. Each UE is associated with (1) a UE ID that uniquely identifies that UE and (2) a partial UE ID that is derived based on the UE ID. The UE IDs may be MAC IDs or some other UE-specific IDs. The UEs are mapped to paging occasions based on their IDs such that UEs with the same partial UE ID are mapped to different paging occasions (block 1612). A paging indicator and a partial UE ID for a recipient UE are sent in a paging occasion for the recipient UE (block 1614). The partial UE ID for the recipient UE may be determined based on a predetermined number of LSBs of the UE ID for the recipient UE.

Figure 17:
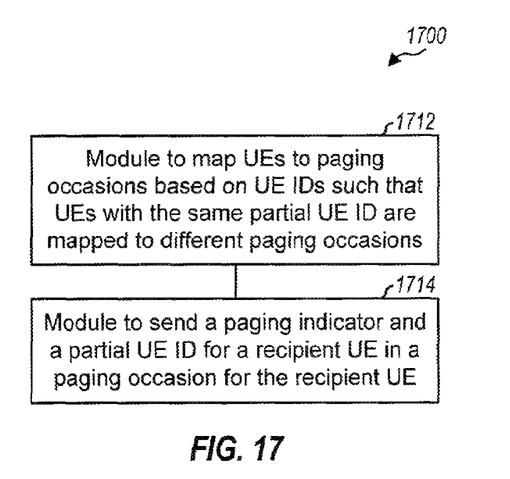
FIG. 17 shows an apparatus for paging.

FIG. 17 shows an apparatus 1700 for paging. Apparatus 1700 includes means for mapping UEs to paging occasions based on their UE IDs such that UEs with the same partial UE ID are mapped to different paging occasions (module 1712) and means for sending a paging indicator and a partial UE ID for a recipient UE in a paging occasion for the recipient UE (module 1714). Modules 1712 and 1714 may comprise processors, electronics devices, hardware devices, electronics components, logical circuits, memories, etc., or any combination thereof.

Figure 18:
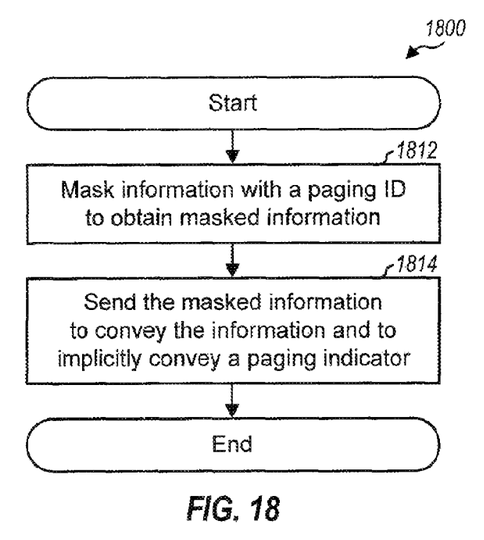
FIG. 18 shows a process for sending an implicit paging indicator.

FIG. 18 shows a design of a process 1800 for sending an implicit paging indicator. A cell masks information with a paging ID to obtain masked information (block 1812). The cell then sends the masked information to convey the information and to implicitly convey a paging indicator (block 1814). The information to be masked may be control information sent on a shared data channel or some other type of information. The cell may mask and send the information by generating a CRC value that is used as the information to be masked, masking the CRC value with the paging ID to generate a masked CRC value, and sending the masked CRC value.

Figure 19:
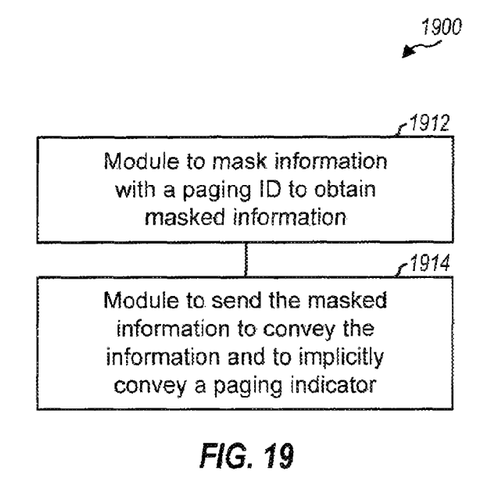
FIG. 19 shows an apparatus for sending an implicit paging indicator.

FIG. 19 shows an apparatus 1900 for sending an implicit paging indicator. Apparatus 1900 includes means for masking information with a paging ID to obtain masked information (module 1912) and means for sending the masked information to convey the information and to implicitly convey a paging indicator (module 1914). Modules 1912 and 1914 may comprise processors, electronics devices, hardware devices, electronics components, logical circuits, memories, etc., or any combination thereof.

Figure 20:
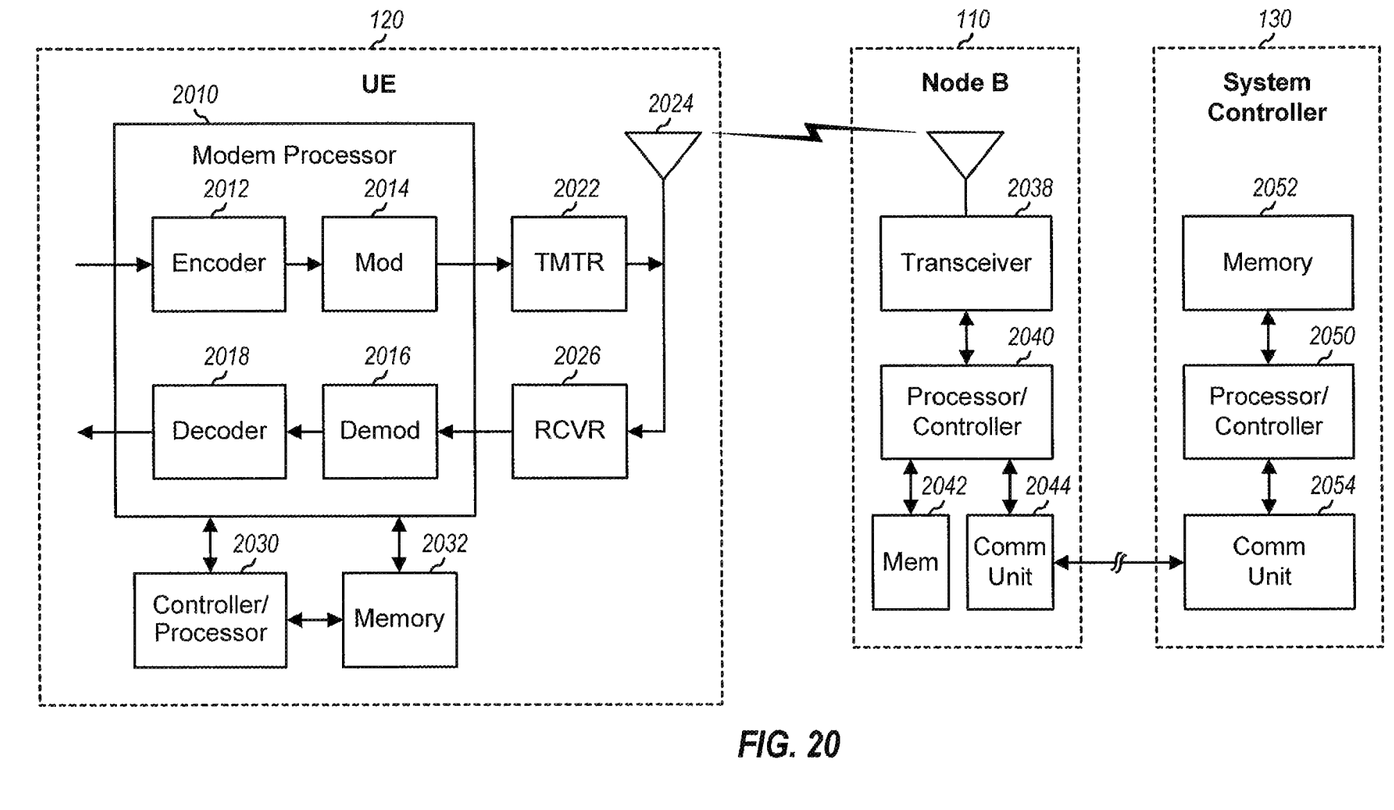
FIG. 20 shows a block diagram of a UE, a Node B, and a system controller.

FIG. 20 shows a block diagram of a design of one UE 120, one Node B 110, and system controller 130 in FIG. 1. In the transmit direction, data and signaling to be sent by UE 120 are processed (e.g., formatted, encoded, and interleaved) by an encoder 2012 and further processed (e.g., modulated, channelized, and scrambled) by a modulator (Mod) 2014 to generate output chips. A transmitter (TMTR) 2022 conditions (e.g., converts to analog, filters, amplifies, and frequency upconverts) the output chips and generates an uplink signal, which is transmitted via an antenna 2024. In the receive direction, downlink signals transmitted by Node B 110 and other Node Bs are received by antenna 2024. A receiver (RCVR) 2026 conditions (e.g., filters, amplifies, frequency downconverts, and digitizes) the received signal from antenna 2024 and provides samples. A demodulator (Demod) 2016 processes (e.g., descrambles, channelizes, and demodulates) the samples and provides symbol estimates. A decoder 2018 further processes (e.g., deinterleaves and decodes) the symbol estimates and provides decoded data. Encoder 2012, modulator 2014, demodulator 2016, and decoder 2018 may be implemented by a modem processor 2010. These units perform processing in accordance with the radio technology used by the wireless communication system.

A controller/processor 2030 directs the operation of various units at UE 120. Controller/processor 2030 may perform process 1200 in FIG. 12 and/or other processes to receive pages. A memory 2032 stores program codes and data for UE 120.

Node B 110 includes a transceiver 2038, a processor/controller 2040, a memory (Mem) 2042, and a communication (Comm) unit 2044. Transceiver 2038 provides radio communication with UE 120 and other UEs. Processor/controller 2040 performs various functions for communication with and paging of the UEs and may implement process 1000 in FIG. 10, process 1400 in FIG. 14, process 1600 in FIG. 16, process 1800 in FIG. 18, and/or other processes. Memory 2042 stores program codes and data for Node B 110. Communication unit 2044 facilitates communication with system controller 130.

System controller 130 includes a processor/controller 2050, a memory 2052, and a communication unit 2054. Processor/controller 2050 performs various functions to support communication and paging for the UEs, e.g., determine which cells are in the paging area of UE 120 and send paging indicators and page messages to these cells. Processor/controller 2050 may implement process 1600 in FIG. 16 and/or other processes. Memory 2052 stores program codes and data for system controller 130. Communication unit 2054 facilitates communication with Node B 110.

The paging techniques described herein may be implemented by various means. For example, these techniques may be implemented in hardware, firmware, software, or a combination thereof. For a hardware implementation, the processing units used to support paging at a UE, a Node B, or a system controller may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the paging techniques may be implemented with modules (e.g., procedures, functions, and so on) that perform the functions described herein. The firmware and/or software codes may be stored in a memory (e.g., memory 2032, 2042 or 2052 in FIG. 20) and executed by a processor (e.g., processor 2030, 2040, or 2050). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor configured to send a paging indicator on a shared control channel distinct from a paging indicator channel (PICH) to a user equipment (UE), to receive channel quality information from the UE, to select a modulation and coding scheme or a transmit power based on the received channel quality information, and to send a page message on a shared data channel distinct from a paging channel (PCH) to the UE when an acknowledgement for the paging indicator is received from the UE using the selected modulation and coding scheme or selected transmit power; and a memory coupled to the at least one processor.

2. The apparatus of claim 1, wherein the paging indicator is sent from multiple cells to the UE, and wherein the page message is sent from a single cell to the UE.

3. The apparatus of claim 1, wherein the at least one processor is configured to monitor for the acknowledgement from the UE and to ascertain a particular cell to serve the UE based on reception of the acknowledgement.

4. The apparatus of claim 1, wherein the at least one processor is configured to receive the acknowledgement from the UE via a random access channel.

5. The apparatus of claim 1, wherein the at least one processor is configured to send UE identification information with the paging indicator, the UE identification information identifying the UE as an intended recipient of the paging indicator.

6. The apparatus of claim 5, wherein the UE identification information comprises a portion of a UE identifier that uniquely identifies the UE.

7. The apparatus of claim 1, wherein the at least one processor is configured to send a retransmission of the page message if an acknowledgement for the page message is not received after the transmission.

8. The apparatus of claim 1, wherein the at least one processor is configured to send an assignment of uplink resources to the UE, the uplink resources being used by the UE to send feedback information for downlink transmission of the page message.

9. The apparatus of claim 1, wherein the channel quality information is received from the UE in response to the paging indicator.

10. A method comprising:
sending a paging indicator on a shared control channel distinct from a paging indicator channel (PICH) to a user equipment (UE);
receiving channel quality information from the UE;
selecting a modulation and coding scheme or a transmit power based on the received channel quality information; and
sending a page message on a shared data channel distinct from a paging channel (PCH) to the UE when an acknowledgement for the paging indicator is received from the UE using the selected modulation and coding scheme or selected transmit power.

11. The method of claim 10, wherein the sending the page message comprises
sending a transmission of the page message to the UE, and
sending a retransmission of the page message if an acknowledgement for the page message is not received after the transmission.

12. The method of claim 10, further comprising:
sending UE identification information with the paging indicator, the UE identification information comprising a portion of a UE identifier that uniquely identifies the UE.

13. An apparatus comprising:
means for sending a paging indicator on a shared control channel distinct from a paging indicator channel (PICH) to a user equipment (UE);
means for receiving channel quality information from the UE;
means for selecting a modulation and coding scheme or a transmit power based on the received channel quality information; and
means for sending a page message on a shared data channel distinct from a paging channel (PCH) to the UE when an acknowledgement for the paging indicator is received from the UE using the selected modulation and coding scheme or selected transmit power.

14. The apparatus of claim 13, wherein the means for sending the page message comprises
means for sending a transmission of the page message to the UE, and
means for sending a retransmission of the page message if an acknowledgement for the page message is not received after the transmission.

15. The apparatus of claim 13, further comprising:
means for sending UE identification information with the paging indicator, the UE identification information comprising a portion of a UE identifier that uniquely identifies the UE.

16. An apparatus comprising:
at least one processor configured to receive a paging indicator on a shared control channel distinct from a paging indicator channel (PICH) for a user equipment (UE), to send channel quality information, to send an acknowledgement for the paging indicator, to receive a page message on a shared data channel distinct from a paging channel (PCH) for the UE, and to process the page message in accordance with a modulation and coding scheme selected based on the channel quality information; and
a memory coupled to the at least one processor.

17. The apparatus of claim 16, wherein the at least one processor is configured to receive UE identification information with the paging indicator and to ascertain that the paging indicator is for the UE based on the UE identification information.

18. The apparatus of claim 16, wherein the at least one processor is configured to receive a transmission of the page message, to send an acknowledgement for the page message if decoded correctly, and to receive a retransmission of the page message if an acknowledgement for the page message is not sent.

19. An apparatus comprising:
at least one processor configured to send a paging indicator on a shared control channel distinct from a paging indicator channel (PICH) to a user equipment (UE) and to send a page message on a shared data channel distinct from a paging channel (PCH) to the UE; and
a memory coupled to that at least one processor.

20. The apparatus of claim 19, wherein the at least one processor is configured to send UE identification information with the paging indicator, the UE identification information identifying the UE as an intended recipient of the paging indicator.

21. The apparatus of claim 19, wherein the paging indicator and the page message are sent from multiple cells to the UE.

22. The apparatus of claim 19, wherein the paging indicator is sent from multiple cells to the UE, and wherein the page message is sent from a single cell to the UE.

23. The apparatus of claim 19, wherein the at least one processor is configured to send control information on the shared control channel, the control information comprising at least one parameter used to recover the page message sent on the shared data channel.

24. The apparatus of claim 19, wherein the shared control channel carries control information for the shared data channel, and wherein the shared data channel carries data for different UEs.

25. The apparatus of claim 19, wherein the at least one processor is configured to send user traffic data on the shared data channel to the UE.

26. An apparatus comprising:
- at least one processor configured to receive a paging indicator via a shared control channel distinct from a paging indicator channel (PICH) and to receive a page message via a shared data channel distinct from a paging channel (PCH); and
- a memory coupled to the at least one processor.

27. The apparatus of claim 26, wherein the at least one processor is configured to receive user traffic data via the shared data channel.

28. An apparatus comprising:
- at least one processor configured to map user equipments (UEs) to paging occasions based on UE identifiers (IDs) such that UEs with same partial UE ID are mapped to different paging occasions, and to send a paging indicator and a partial UE ID for a recipient UE in a paging occasion on a shared control channel distinct from a paging indicator channel (PICH) for the recipient UE; and
- a memory coupled to the at least one processor.

29. The apparatus of claim 28, wherein each of the UEs is associated with a UE ID that uniquely identifies the UE and a partial UE ID that is derived based on the UE ID.

30. The apparatus of claim 29, wherein the at least one processor is configured to determine the partial UE ID for the recipient UE based on a predetermined number of least significant bits (LSBs) of a UE ID for the recipient UE.

31. The apparatus of claim 28, wherein the UE IDs are Radio Network Temporary Identifiers (RNIs), International Mobile Subscriber Identifiers (IMSIs), or Medium Access Control (MAC) IDs.

32. A method comprising:
- mapping user equipments (UEs) to paging occasions based on UE identifiers (IDs) such that UEs with same partial UE ID are mapped to different paging occasions; and
- sending a paging indicator and a partial UE ID for a recipient UE in a paging occasion on a shared control channel distinct from a paging indicator channel (PICH) for the recipient UE.

33. The method of claim 32, further comprising:
- determining the partial UE ID for the recipient UE based on a predetermined number of least significant bits (LSBs) of a UE ID for the recipient UE.

* * * * *